Aug. 9, 1949.  N. J. ROTH  2,478,596
POULTRY ROOST
Filed Feb. 12, 1948  3 Sheets-Sheet 1
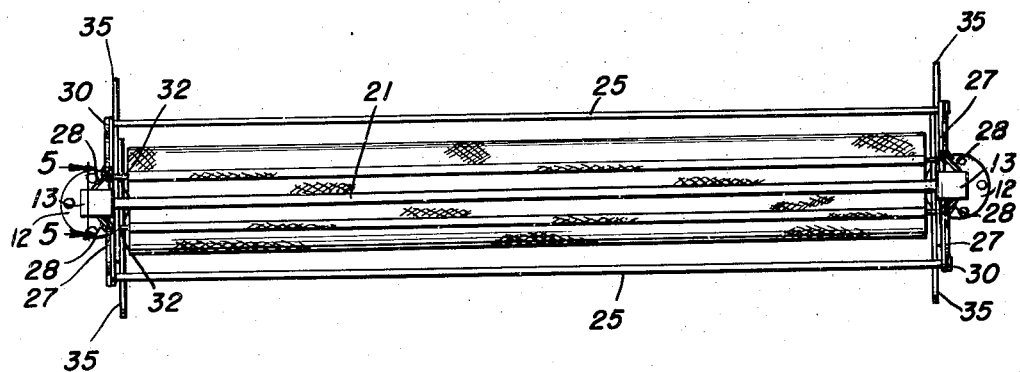
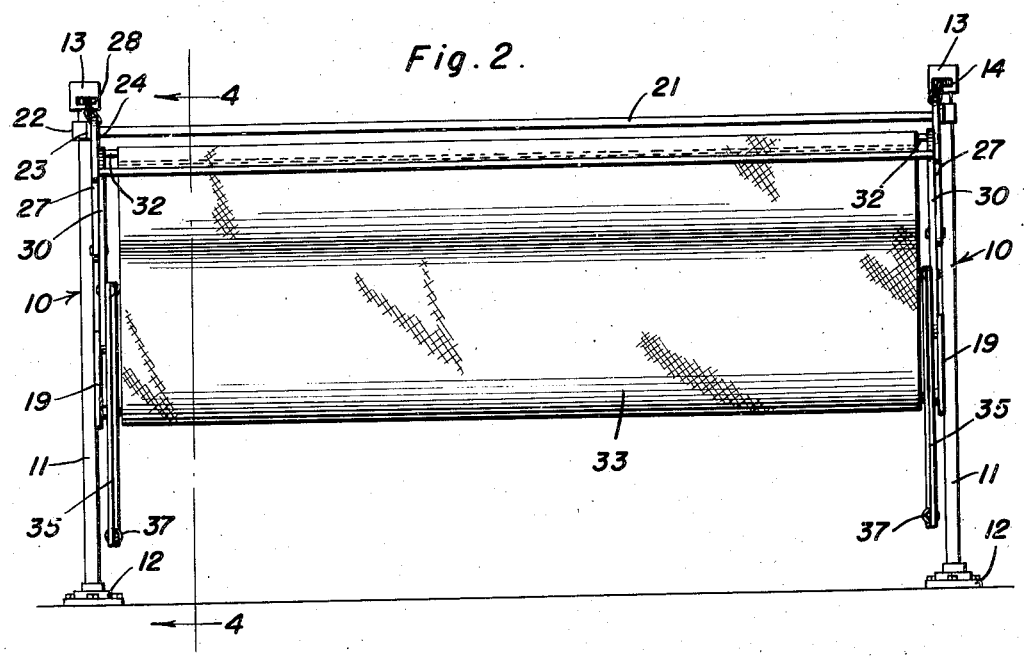
Nicholas J. Roth
INVENTOR.

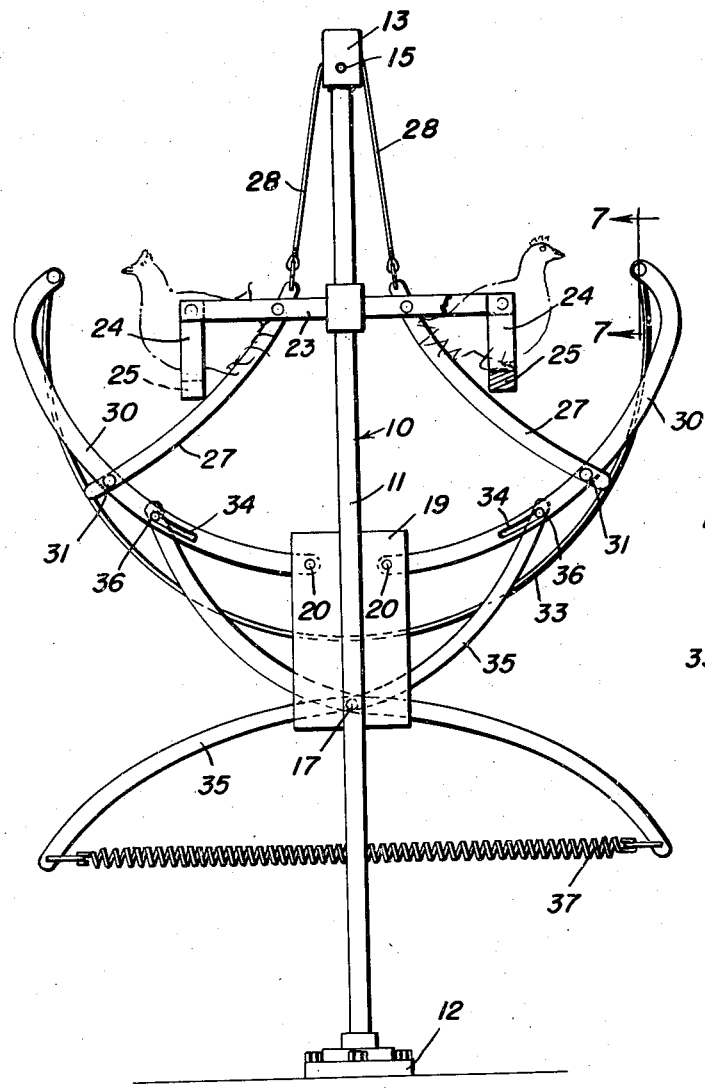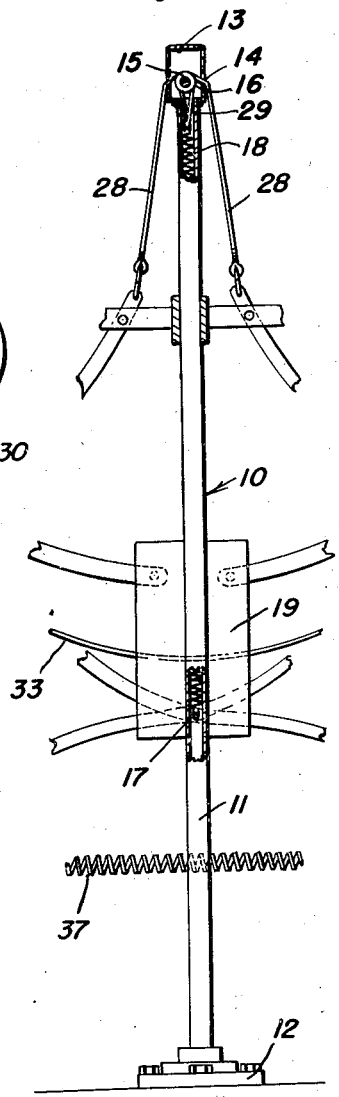

Aug. 9, 1949.  N. J. ROTH  2,478,596
POULTRY ROOST

Filed Feb. 12, 1948  3 Sheets-Sheet 3

Nicholas J. Roth
INVENTOR.

BY *O'Brien and Jackson*
Attorneys

Patented Aug. 9, 1949

2,478,596

UNITED STATES PATENT OFFICE 2,478,596

POULTRY ROOST

Nicholas J. Roth, Trenton, N. J.

Application February 12, 1948, Serial No. 7,842

4 Claims. (Cl. 119—24)

This invention relates to a poultry roost and has for its primary object to increase the working space within an enclosure housing the poultry in order to facilitate the cleaning and preservation of sanitary conditions in such an enclosure during such periods as the roost is unoccupied.

Another object is to prevent the droppings from falling on the floor of the enclosure, thus to reduce the labor required for cleaning the enclosure.

The above and other objects may be attained by employing this invention which embodies among its features a pair of spaced vertical tubular standards, a carriage movable vertically adjacent the upper end of each standard, perches carried by and extending horizontally between the carriages, a cable coupled to each carriage and extended upwardly over the upper end of and down into the interior of an adjacent standard, and a counter-balancing spring within each standard coupled at one end to a cable and at its opposite end to its respective standard.

Other features include an arm pivoted on each side of each standard, supporting bars carried by and extending horizontally between the arms on opposite standards, links pivotally coupled to the carriages and to the arms to cause said arms to spread as the carriages move downwardly under the weight of a fowl on a perch, and a dropping receiving apron of flexible sheet material carried by the supporting bars and extending between the standards.

Still other features include crossed actuating levers pivoted intermediate their ends to each standard, pin and slot connections coupling the upper ends of the actuating levers to the arms and a retractile coil spring coupled to and extending between the lower ends of each pair of actuating levers.

In the drawings:

Figure 1 is a top plan view of a poultry roost embodying the features of this invention;

Figure 2 is a side view of the poultry roost illustrated in Figure 1;

Figure 3 is an end view, on a slightly enlarged scale, of the poultry roost illustrated in Figure 1, showing the roost in open position, with a portion thereof in section;

Figure 5 is a fragmentary enlarged sectional view of the device taken substantially along the line 5—5 of Figure 1;

Figure 4:
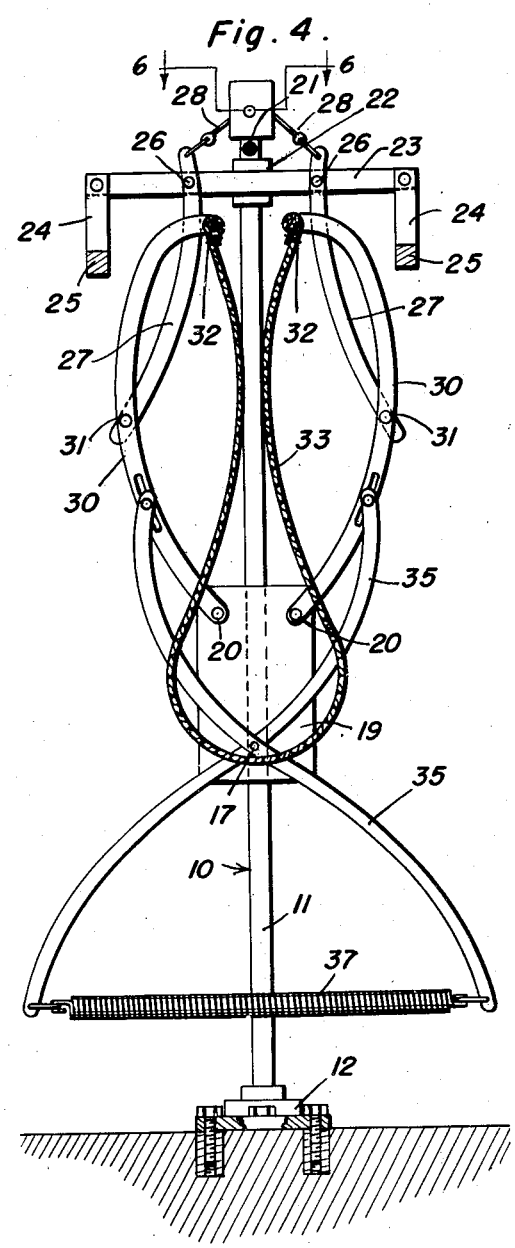
Figure 4 is a transverse sectional view on an enlarged scale taken substantially along the line 4—4 of Figure 2, with portions of the base shown in section.

Referring to the drawings in detail this improved poultry roost comprises a pair of spaced vertical standards designated generally 10 each of which is formed of a tubular body 11 mounted on a suitable base 12 which may be bolted or otherwise attached to a floor or other supporting surface. The upper end of each standard is open and has welded or otherwise rigidly fixed thereto a suitable housing 13 having opposed vertical openings 14 in its side walls. Extending transversely through each housing 13 is a spindle 15 upon which cable guiding pulleys 16 are rotatably supported. Anchored as at 17 within the tubular body 11 of each standard 10 is the lower end of a retractile coil spring 18 the purpose of which will be more fully hereinafter explained. Welded or otherwise attached to each standard 10 intermediate its upper and lower ends is a supporting plate 19, each of which is provided adjacent its upper end with spaced apertures for the reception of pivot pins 20. The upper ends of the standards 10 are joined by a longitudinally extending tie bar 21 which cooperates with the base plates 12 in holding the standards in spaced parallel relation.

Mounted for vertical sliding movement on each standard near its upper end is a sleeve 22 carrying a cross bar 23 which extends perpendicularly with relation to the standard, and supported at opposite ends of each cross bar 23 is a depending bracket 24. Fixed at opposite ends to the brackets 24 on opposite cross bars 23 are perches 25 which extend longitudinally of the roost in parallel relation to the tie bar 21. It will thus be seen that the perches 25 will be free to move up and down with the cross bars 23.

Figure 6:
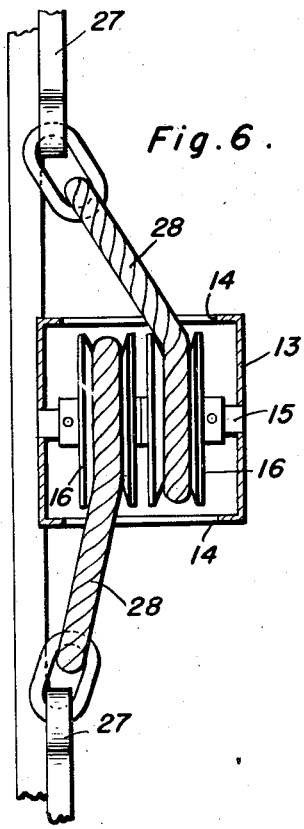
Figure 6 is a fragmentary enlarged top horizontal sectional view taken substantially on the line 6—6 of Figure 4.
Figure 7:
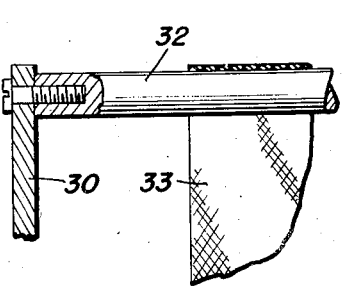
Figure 7 is an enlarged detail view partially in section showing the connection of the apron supporting bars and the levers, and a fragment of the apron.

Pivotally connected as at 26 to each cross bar 23 intermediate its respective sleeve 22 and the depending brackets 24 are links 27, to the upper ends of which are connected cables 28 which as illustrated in Figures 5 and 6 are trained over the guide pulleys 16 and joined together at their adjacent ends to form a loop 29 which is coupled to the upper end of the spring 18 in an adjacent standard 10. It will thus be seen that the carriages formed by the sleeves 22 and cross bars 23 will be held upwardly under yielding force as illustrated in Figures 1, 2 and 4.

Pivotally mounted on the pivot pins 20 carried by the plates 19 are arms 30, and pivotally coupled as at 31 to the arms 30 intermediate their ends are the ends of the links 27 remote from the pivots 26. Hence as the perches 25 moves downwardly, the cross bars 23 will likewise move downwardly and cause the links 27 to spread the arms 30 into the position illustrated in Figures 3 and 5. Extending between the arms 30 on opposite sides of the standards, and fixed adjacent the ends of the arms 30 remote from the pivots 29 are supporting bars 32. These bars 32 lie parallel to the tie rod 21, and looped around said supporting bars 32 are opposite side edges of an apron 33 which is formed of a suitable flexible sheet material. When the arms 30 are extended as illustrated in Figure 3 the apron 33 lies below the perches 25 to collect any droppings from a fowl or fowls occupying the perches. Formed in the arms 30 between the pivots 29 and the pivots 31 are elongated slots 34 the purpose of which will presently appear.

Pivotally connected to each anchoring pin 17 to which the lower ends of the springs are connected are crossed actuating levers 35, the upper ends of which are pierced to receive guide pins 36 which are received in the slots 34 in the arms 30 in order to effect a pivotal and sliding connection between the upper ends of the actuating levers 35 and the arms 30. A retractile coil spring 37 extends between each pair of actuating levers 35 and is coupled thereto adjacent the lower ends of said levers 35 in such a manner as to exert pull thereon when the latter are spread as illustrated in Figure 3.

In use the device is set up within the enclosure with which it is to be used by attaching the base plates 12 to the floor thereof so as to support the columns 10 in spaced vertical relation. The upper ends of the standards are coupled by the tie bar 21 and the supporting bars 32, together with the apron are then mounted on the arms 30 in any suitable manner so that the apron 33 hangs down between the standards 10 substantially as illustrated in Figures 1, 2 and 4. In this position the sleeves 22 and cross bars 23 will be in elevated position so that the perches 25 are supported near the top of the device. When a fowl lights on a perch, its weight will be sufficient to overcome the tension of the springs 18 and 37 so that the sleeves 22 and cross bars 23 will move downwardly thus causing the arms 30 to swing outwardly into the position illustrated in Figure 3 so as to spread the apron 33 below the perches. Simultaneously with the outward movement of the arms 30, the crossed actuating levers 35 will be moved about their pivots 17 so as to extend the springs 37. When the fowls leave the perches 25 it will be obvious that the springs 18 and 37 will contract, thus causing the parts to move into folded position as illustrated in Figure 4, so as to be out of the way of an attendant while the enclosure is being cleaned.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

1. A poultry roost comprising a pair of spaced vertical tubular standards, each standard having an upper end, a carriage movable vertically on each standard adjacent the upper end thereof, perches carried by and extending horizontally between the carriages, a cable coupled to each carriage and extending upwardly over and down into the interior of an adjacent standard and a counter-balancing spring within each standard coupled to an adjacent cable and to its respective standard.

2. A poultry roost comprising a pair of spaced vertical tubular standards, each standard having an upper end, a carriage movable vertically on each standard adjacent the upper end thereof, perches carried by and extending horizontally between the carriages, a cable coupled to each carriage and extending upwardly over and down into the interior of an adjacent standard, a counter-balancing spring within each standard coupled to an adjacent cable and to its respective standard, an arm pivotally carried on each side of each standard, supporting bars carried by and extending horizontally between the arms on opposite standards, links pivotally coupled to the carriages and to the arms to cause the arms to spread as the carriages move downwardly under the weight of a fowl on a perch, and a dropping receiving apron of flexible sheet material carried by the supporting bars.

3. A poultry roost comprising a pair of spaced vertical tubular standards, each standard having an upper end, a carriage movable vertically on each standard adjacent the upper end thereof, perches carried by and extending horizontally between the carriages, a cable coupled to each carriage and extending upwardly and down into the interior of an adjacent standard, a counter-balancing spring within each standard coupled to an adjacent cable and to its respective standard, an arm pivotally carried on each side of each standard, supporting bars carried by and extending horizontally between the arms on opposite standards, links pivotally coupled to the carriages and to the arms to cause the arms to spread as the carriages move downwardly under the weight of a fowl on a perch, a dropping receiving apron of flexible sheet material carried by the supporting bars, crossed actuating levers pivoted to each standard, pin and slot connections coupling the actuating levers to the arms, and a retractile coil spring coupled to and extending between each pair of actuating levers.

4. A poultry roost comprising a pair of spaced vertical tubular standards, each standard having an upper end, a carriage movable vertically on each standard adjacent the upper end thereof, perches carried by and extending horizontally between the carriages, an arm pivotally carried on each side of each standard, supporting bars carried by and extending horizontally between the arms on opposite standards, links pivotally coupled to the carriages and to the arms to cause the arms to spread as the carriages move downwardly under the weight of a fowl on a perch, a dropping receiving apron of flexible sheet material carried by the supporting bars, crossed actuating levers pivoted to each standard, pin and slot connections coupling the actuating levers to the arms and a retractile coil spring coupled to and extending between each pair of actuating levers.

NICHOLAS J. ROTH.

REFERENCES CITED

The following references are of record in the file of this patent:

UNITED STATES PATENTS

| Number | Name | Date |
| --- | --- | --- |
| 920,135 | Harrod | May 4, 1909 |
| 1,213,526 | Michaud | Jan. 23, 1917 |